US012663028B2

(12) United States Patent　　(10) Patent No.: US 12,663,028 B2

Gray et al.　　(45) Date of Patent: Jun. 23, 2026

---

(54) PNEUMATIC SYSTEM FLOW BALANCING ARCHITECTURE AND METHOD

(71) Applicant: The Boeing Company, Arlington, VA (US)

(72) Inventors: Cody Daniel Gray, Jersey City, NJ (US); Kevin Ronald Uleck, Forest Hill, MD (US); Alexander William Feldstein, Natick, MA (US)

(73) Assignee: THE BOEING COMPANY, Arlington, VA (US)

( * ) Notice: Subject to any disclaimer, the term of this patent is extended or adjusted under 35 U.S.C. 154(b) by 237 days.

(21) Appl. No.: 18/406,487

(22) Filed: Jan. 8, 2024

(65) Prior Publication Data

US 2025/0223982 A1　Jul. 10, 2025

(51) Int. Cl.

| | |
|---|---|
| *F15B 21/0427* | (2019.01) |
| *B64C 21/04* | (2023.01) |
| *B64C 21/08* | (2023.01) |
| *F15D 1/02* | (2006.01) |
| *F16K 17/00* | (2006.01) |
| *F15B 11/042* | (2006.01) |
| *F15B 11/16* | (2006.01) |

(52) U.S. Cl.

CPC .......... *F15B 21/0427* (2019.01); *B64C 21/04* (2013.01); *B64C 21/08* (2013.01); *F15D 1/02* (2013.01); *F16K 17/00* (2013.01); *F15B 11/0423* (2013.01); *F15B 11/165* (2013.01); *F15B 2211/40515* (2013.01); *F15B 2211/41572* (2013.01); *F15B 2211/426*

(2013.01); *F15B 2211/50536* (2013.01); *F15B 2211/526* (2013.01); *F15B 2211/8855* (2013.01)

(58) Field of Classification Search

CPC .............. F15B 21/0427; F15B 11/0423; F15B 11/165; F15B 2211/40515; F15B 2211/41572; F15B 2211/426; F15B 2211/50536; F15B 2211/526; F15B 2211/8855; F15D 1/02; F16K 17/00; B64C 21/04; B64C 21/08; B64D 13/06

USPC .......................................... 137/1

See application file for complete search history.

(56) References Cited

U.S. PATENT DOCUMENTS

| | | | |
|---|---|---|---|
| 10,086,927 B2 | 10/2018 | Shmilovich et al. | |
| 10,556,671 B2 * | 2/2020 | Warsop ................... | B63G 8/00 |
| 11,034,463 B2 | 6/2021 | White | |
| 12,415,608 B2 * | 9/2025 | Balocchi ................ | B64D 13/06 |
| 2017/0297680 A1 * | 10/2017 | Shmilovich .......... | F15B 21/042 |
| 2019/0291876 A1 * | 9/2019 | Kamenetz ............. | B64D 13/02 |
| 2021/0197974 A1 * | 7/2021 | Zhu ........................ | B01D 53/04 |
| 2022/0315208 A1 * | 10/2022 | Warsop .................. | B64C 21/04 |

(Continued)

*Primary Examiner* — Minh Q Le

(74) *Attorney, Agent, or Firm* — COATS & BENNETT, PLLC

(57) ABSTRACT

A pneumatic system incorporated within a platform. The platform includes an air source that supplies air to an outlet and associated component. The pneumatic system includes conduit that extends between the air source to the outlet. A balancing valve and a flow control valve are positioned along the conduit to adjust the flow of air. The balancing valve and the flow control valve are controlled to provide the air to the outlet to meet the demands of the component. The control also minimizes changes in demand of air from the air source.

20 Claims, 7 Drawing Sheets

(56) References Cited

U.S. PATENT DOCUMENTS

| 2023/0265793 A1* | 8/2023 | Retersdorf | ............. B64D 27/33 |
| | | | 60/782 |
| 2024/0400214 A1* | 12/2024 | Mocan | ................. B64D 27/355 |
| 2025/0108925 A1* | 4/2025 | Bartosz | ................. B64D 13/06 |

* cited by examiner

PNEUMATIC SYSTEM FLOW BALANCING ARCHITECTURE AND METHOD

TECHNOLOGICAL FIELD

The present disclosure relates generally to the field of pneumatic systems and, more specifically, to pneumatic systems having a balancing valve to reduce fluctuations on demand from an air source.

BACKGROUND

Various types of platforms such as but not limited to vehicles and manufacturing equipment include pneumatic systems that use controlled airflow to achieve a desired physical effect. The pneumatic systems generally move air through conduits to one or more downstream components. Existing systems often utilize sensors positioned in the conduits to detect one or more aspects of the air source (e.g., mass flow, pressure). Signals from the sensors are used to control the air that flows through the system.

Typical high mass flow pneumatic systems generally run in quasi-steady state conditions where demand by the components for the air is matched to output of the air source. During steady state conditions, signals from the sensors indicating the air moving through the system are processed such that the response time to adjust the air flow is adequate to meet the demand. However, the response time is not adequate for systems with highly variable air demand. The air demand by the components can vary rapidly based on changes in the operating conditions of the platform. The amount of time needed by the system to receive and process the signals from the sensors, and adjust the system accordingly, is too slow for high speed control applications and may cause undesirable interactions with the air source that can be complex or costly to resolve. Further, the lack of air supply can cause issues with the effectiveness of the components.

Therefore, there is a need for a pneumatic system that de-couples air source dynamics from air output demand dynamics.

SUMMARY

One aspect is directed to a pneumatic system within a platform that supplies air from an air source to a downstream outlet. The pneumatic system comprises a conduit that extends between the air source and the outlet. A balancing valve is positioned along the conduit between the air source and the outlet with the balancing valve configured to adjust a flow of air through the conduit. A flow control valve is positioned along the conduit with the flow control valve configured to adjust the flow of the air that is directed to the outlet. A computing device synchronizes adjustments to the balancing valve and the flow control valve to actively control the flow of air through the conduit.

In another aspect, the computing device controls the balancing valve and the flow control valve to set the pressure for the pressure to remain substantially constant at the air source.

In another aspect, the computing device is configured to synchronously adjust the balancing valve and the flow control valve for the mass flow along the conduit to be variable downstream from the balancing valve to the outlet.

In another aspect, the computing device is configured to synchronously adjust the balancing valve and the flow control valve to maintain a total resistance along the conduit.

In another aspect, the computing device obtains, from a flight control system, an air demand for the air at the outlet, then synchronously adjusts the balancing valve and the flow control valve accordingly to meet the demand.

In another aspect, the pneumatic system is positioned within an aircraft and is part of an active flow control system that delivers the air to a flow control effector mounted at the outlet.

In another aspect, the balancing valve includes an exhaust port.

In another aspect, the conduit comprises a main line and a branch line that extends from the main line and wherein the balancing valve is positioned along the main line and the flow control valve is positioned along the branch line.

One aspect is directed to a pneumatic system within a platform that supplies air from an air source to downstream outlets. The pneumatic system comprises a conduit to direct the air from the air source to the downstream outlets. A balancing valve is positioned along the conduit. A flow control valve is positioned along the conduit. The balancing valve and the flow control valve are synchronously controlled.

In another aspect, a computing device is configured to inversely control the balancing valve and the flow control valve.

In another aspect, the flow control valve is a first flow control valve that controls the air to a first one of the downstream outlets and further comprising a plurality of additional flow control valves that control the air to a plurality of additional downstream outlets.

In another aspect, the balancing valve and the flow control valve de-couple air source dynamics at the downstream outlets from air output demand dynamics at the air source.

In another aspect, the balancing valve and the flow control valve are synchronously controlled to maintain a pressure within the conduit at the air source.

In another aspect, the balancing valve is positioned along the conduit upstream from the flow control valve.

In another aspect, an air conditioning unit is positioned along the conduit to heat the air with the air conditioning unit positioned upstream from the balance valve and the flow control valve.

One aspect is directed to a method of controlling air that moves through a pneumatic system from an air source to an outlet. The method comprises: directing the air through conduit from the air source to the outlet with the air initially moving through a balancing valve and a flow control valve prior to be expelled from the outlet; determining a change in a demand for air at the outlet; and in response to determining the change in the demand, synchronously adjusting both the flow control valve and the balancing valve and thereby decoupling air source dynamics at the outlet from air output demand dynamics at the air source.

In another aspect, the method further comprises maintaining a total resistance on the air source 110 while adjusting the flow control valve and the balancing valve.

In another aspect, the method further comprises simultaneously adjusting one of the balancing valve and the flow control valve and increasing the resistance a first amount and adjusting the other of the balancing valve and the flow control valve and decreasing the resistance by the first amount.

In another aspect, the method further comprises heating the air along the conduit prior to the air reaching the balancing valve.

In another aspect, determining the change in the demand for the air at the outlet comprises receiving the change in the demand from a flight control system of an aircraft.

The features, functions and advantages that have been discussed can be achieved independently in various aspects or may be combined in yet other aspects, further details of which can be seen with reference to the following description and the drawings.

DETAILED DESCRIPTION

Figure 1:
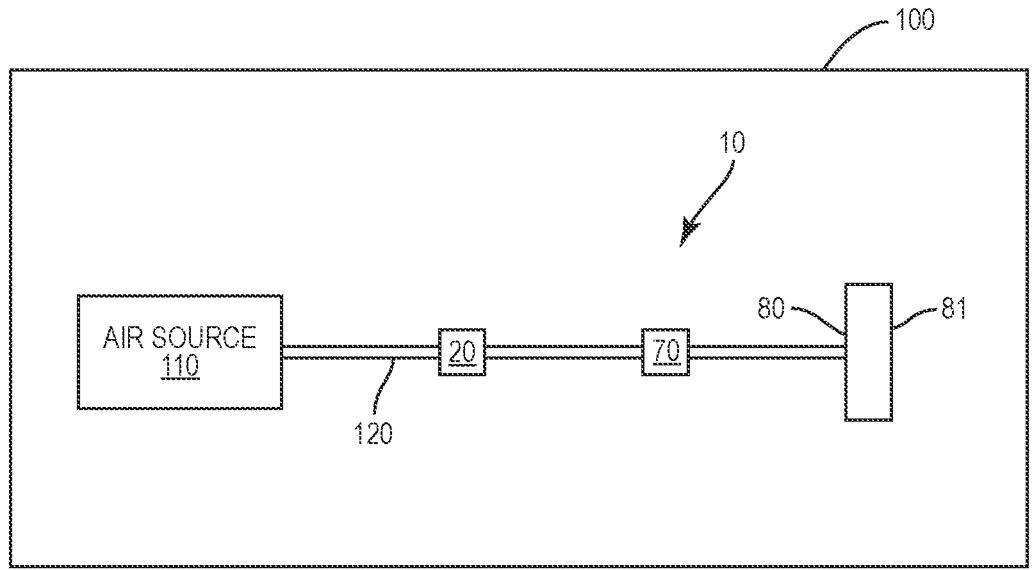
FIG. 1 is a schematic diagram of a pneumatic system within a platform.

FIG. 1 schematically illustrates a pneumatic system 10 incorporated within a platform 100. The platform 100 includes an air source 110 that supplies air to an outlet 80 and associated component 81. The pneumatic system 10 includes one or more conduits 120 that deliver the air from the air source 110 to the outlet 80. A balancing valve 20 and a flow control valve 70 are positioned along the conduits 120 to adjust the flow of air. The balancing valve 20 and the flow control valve 70 are synchronously controlled to provide the air to the outlet 80 to sufficiently meet the demands of the component 81. Controlling the balancing valve 20 and the flow control valve 70 as such also minimizes changes in demand of air from the air source 110. The pneumatic system 10 synchronously controls the balancing valve 20 and the flow control valve 70 to de-couple air source dynamics from air output demand dynamics.

The pneumatic system 10 is applicable for use in a variety of different platforms 100. The platform 100 may be, for example, a mobile platform, a stationary platform, a land-based structure, an aquatic-based structure, or a space-based structure. More specifically, the platform may be but is not limited to a surface ship, a tank, a personnel carrier, a train, a spacecraft, a space station, a satellite, a submarine, an automobile, vehicle, industrial equipment, a manufacturing facility, a building, or other suitable platforms.

Figure 2:
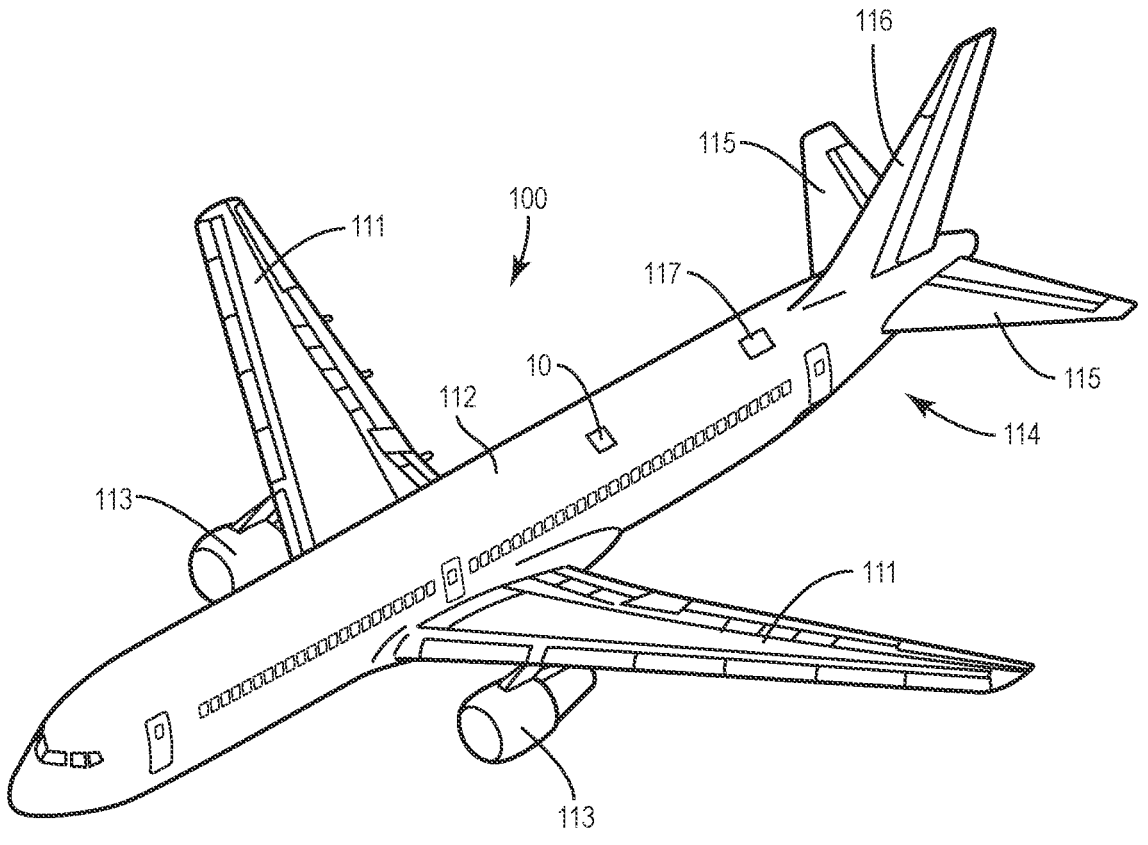
FIG. 2 is an isometric diagram of a pneumatic system within an aircraft.

FIG. 2 illustrates an example in which the platform 100 is an aircraft for transporting people and/or cargo. The exemplary aircraft 100 includes a fuselage 112, wings 111, and engines 113. A tail section 114 includes horizontal stabilizers 115 and a vertical stabilizer 116. An auxiliary power unit (APU) 117 provides electrical and pneumatic power to the aircraft when the engines 113 are not running.

A pneumatic system 10 is incorporated into the aircraft 100. The pneumatic system 10 can be used in various different applications on the aircraft. In one example, the pneumatic system 10 is part of an active flow control system that enhances performance and efficiency of the aerodynamic surfaces in at least one of the wings 111 and tail section 114. The pneumatic system 10 supplies air to flow control effectors that direct a gas flow over an aerodynamic structure. The gas flow includes small jets of air that increase the performance and efficiency of the aerodynamic surface. The air that is expelled by the flow control effectors can vary during flight of the aircraft 100. In this example, the air source 110 is provided through the APU 117 or from engine bleed from one or more of the engines 113.

Figure 3:
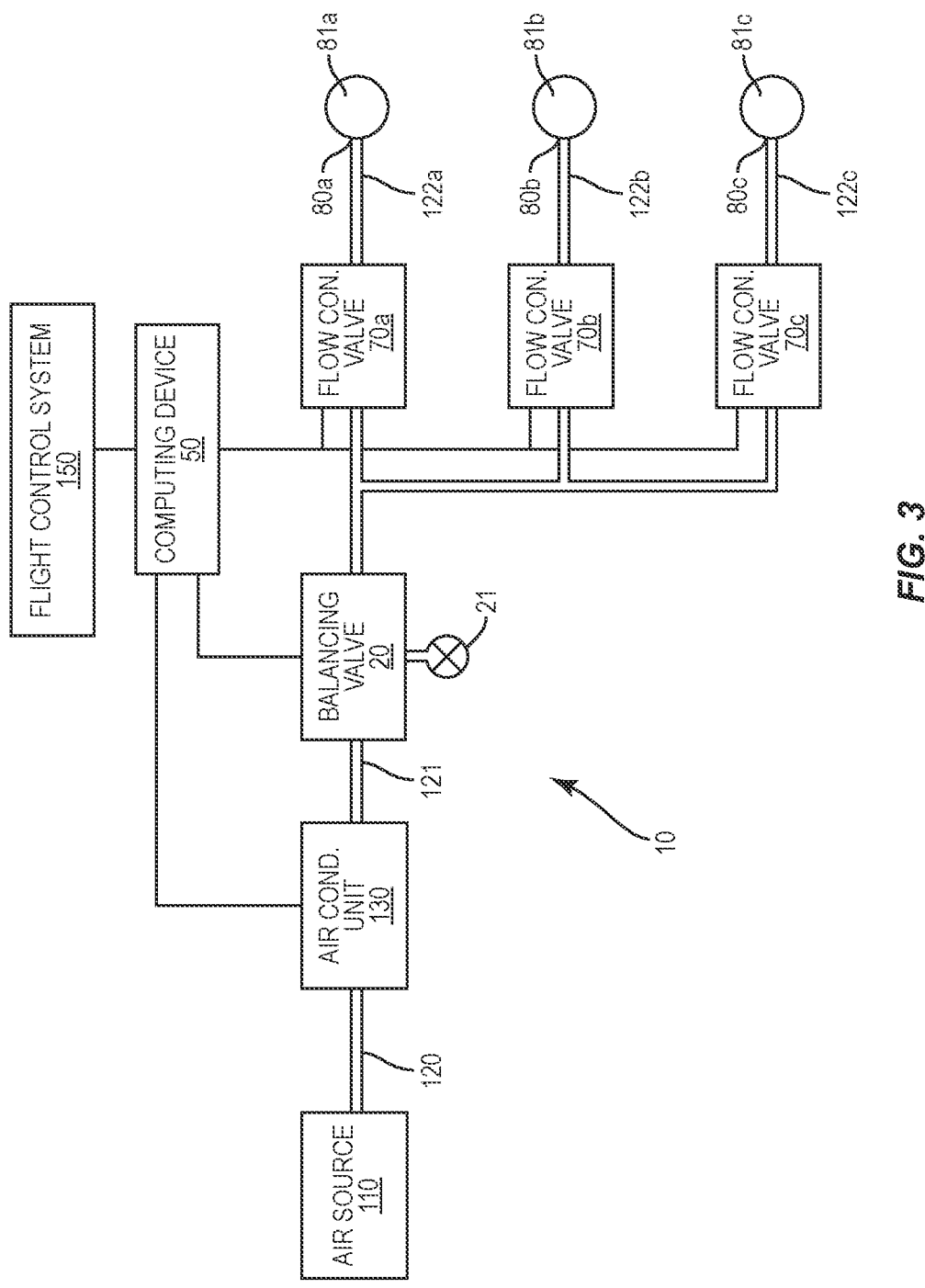
FIG. 3 is a schematic diagram of a pneumatic system positioned within a platform and configured to deliver air from an air source to components.

FIG. 3 illustrates a schematic diagram of the pneumatic system 10 incorporated within the aircraft for supplying air to components 81. FIG. 3 includes one example in which the components 81 are flow control effectors 81, although it is understood that other examples can include different components 81. Air is supplied to the pneumatic system 10 through an air source 110 (e.g., engine 113, APU 117). Conduit 120 carries the air from the air source 110 to the outlets 80 for use by the air flow effectors 81. In some examples, the conduit 120 includes a single line that extends between the air source 110 and outlets 80. In some examples as illustrated in FIG. 3, the conduit 120 includes a main line 121 and branch lines 122. In some examples, the main line 121 is configured to carry a larger volume of air than the branch lines 122. In some examples, each of the branch lines 122 is configured to carry the same volume of air and have the same maximum mass flow. The number and configuration of the main line 121 and branch lines 122 can vary depending upon the application. Conduit 120 can include various sizes and cross-sectional shapes (e.g., square, rectangular, circular, ovular). In some illustrative examples, the different sections of the conduit 120 have more than one cross-sectional shape and/or size.

In some examples, the pneumatic system 10 includes an air conditioning unit 130. In some examples as illustrated in FIG. 3, the air conditioning unit 130 is separate from the air source 110 and is positioned along the conduit 120 to treat the air. In other examples, the air conditioning unit 130 is incorporated into the air source 110. The air conditioning unit 130 is configured to heat and/or cool the air that is supplied by the air source 110. In some examples, the air conditioning unit 130 is configured to provide a temperature within a range of the ambient temperature outside of aircraft. In the example of FIG. 3 in which the air conditioning unit 130 is separate from the air source 110, the air conditioning unit is positioned upstream from the balancing valve 20. Other examples position the air conditioning unit 130 downstream from the balancing valve 20. The air conditioning unit 130 can include various configurations, including but not limited to various heating elements, fans, heater strips, and condensers. In some examples, these elements are positioned within the conduit 120, with other examples having them be separate from—and connected by—separating ducts to the conduit 120.

The balancing valve 20 is configured to control the conduit of air through the conduit 120. In some examples, the balancing valve 20 is positioned upstream from the one or more flow control valves 70 and downstream from the air source 110. The balancing valve 20 can be in line with the one or more flow control valves 70, or positioned at other configurations that are not in line. In some examples, the balancing valve 20 is adjustable at various positions between an open position that provides for the full amount of air to flow through the main line 121, and a closed position that prevents the conduit of air. In some examples, the balancing valve 20 includes an exhaust port 21 to exhaust air from the main line 121. In some examples, the exhaust port 21 is controlled through a computing device 50 that oversees the operation of the pneumatic system 10. In other examples, the exhaust port 21 is configured to exhaust the air at a predetermined level, such as a predetermined pressure or mass flow rate.

One or more flow control valves 70 are positioned along the conduit 120. In the example of FIG. 3, flow control valves 70 are positioned along each of the branch lines 122 and configured to be adjusted to control the flow of air along the branch line 122. In some examples, the flow control valves 70 are adjustable at various positions between a fully open position and a closed position.

A computing device 50 controls the operation of pneumatic system 10. The computing device 50 adjusts the balancing valve 20 and flow control valves 70 based on the commanded air demand at the outlets 80. The commanded air demand can be obtained from an overall controller, such as a flight control system 150 that controls the operation of one or more aspects of the aircraft. In one example, the commanded air is the amount of air that is to be expelled from each of the different flow control effectors 81. The different components 81 can have the same or different air demands. The demand on the pneumatic system 10 for air at each of the outlets 80 is known from prior calibration processes. The demand is characterized in terms of mass flow, supply conditions, and valve positions.

The computing device 50 is configured to control the positioning of the balancing valve 20 and the flow control valves 70. The computing device 50 is configured to adjust the positioning of the balancing valve 20 and flow control valves 70 to control the air supplied to the outlets 80 to meet the commanded demands. As the demands change, the computing device 50 adjusts one or more of the balancing valve 20 and flow control valves 70 accordingly. In some examples, the air demand is less than the air that is provided from the air source 110, creating an excess of air. This excess results in exhausting excess mass flow of the system through the balancing valve 20 at the exhaust port 21.

Figure 4:
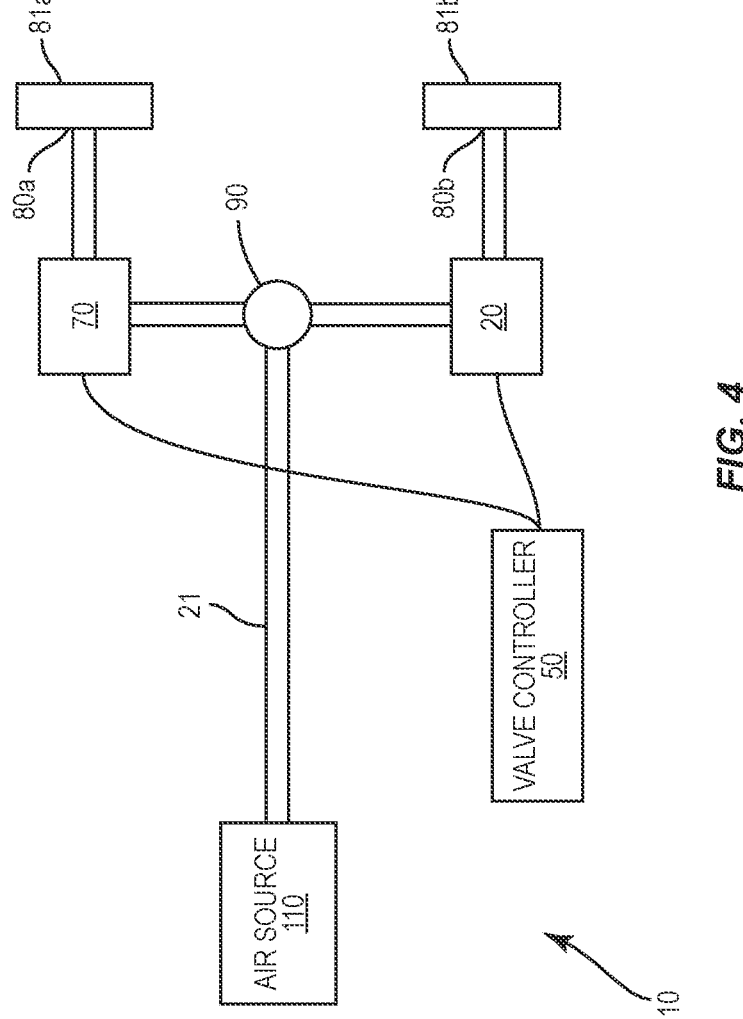
FIG. 4 is a schematic diagram of another pneumatic system positioned within a platform between an air source and components.

In some examples as illustrated in FIG. 3, the balancing valve 20 is positioned upstream from the one or more flow control valves 70 and/or in line with the air source 110. In other examples, the balancing valve 20 is positioned at other locations relative to one or more of the flow control valves 70, such as not in line with the one or more flow control valves 70. FIG. 4 illustrates an example in which the balancing valve 20 is offset and not in line with the flow control valve 70. In the example of FIG. 4, the balancing valve 20 is positioned downstream from a junction 90 away from the flow control valve 70.

The pneumatic system 10 is operated in a manner that minimizes or reduces fluctuations in demand from the air source 110. In some examples, the pneumatic system 10 provides for a constant demand for air from the air source 110. In some examples, the pneumatic system 10 provides for a gradual change on the demand at the air source 110 by rapid actuation of the balancing valve 20 while the effectors 81 are actuated quickly via rapid changes of the one or more flow control valves 70. This allows for the air source 110 to have better overall performance as there is little to no variation in the demanded output. In one example in which the air is bleed air from an engine 113 of the aircraft, the engine 113 more effectively operates as opposed to operating with rapidly changing demands that cause different burdens on the engine 113.

The air source 110 has a slow reaction relative to the flow control valves 70. Mass flow is conserved between the air source 110 and the first valve (either balance valve 20 or flow control valve 70). Conversely, air pressure is not conserved as it is changing due to friction, etc. The pneumatic system 10 operates to maintain a substantially constant pressure, or a slowly changing pressure downstream from the air source 110. In some examples, the balance valve 20 is adjusted for the pressure to be substantially constant at the air source 110. In some examples, the pneumatic system 10 is configured to synchronously adjust the balancing valve 20 and the flow control valve 70 for the air source 110 to produce a substantially constant mass flow and pressure.

Figure 5:
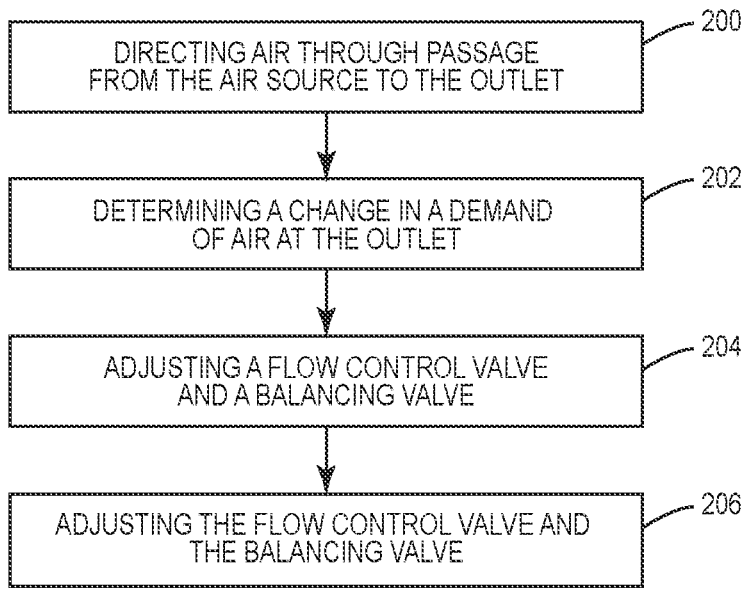
FIG. 5 is a flowchart diagram of a method of controlling air that moves through a pneumatic system.

FIG. 5 illustrates a method of controlling air that moves through a pneumatic system 10 from an air source 110 to an outlet 80. This method provides for air demand at a single outlet 80, although it is understood that the method is configured to provide air to one or more outlets 80.

The method includes directing air through conduit 120 from the air source 110 to the outlet 80 (block 200). In some examples, the air initially moves through a balancing valve 20 and then through a flow control valve 70 prior to being expelled from the outlet 80. The air at the outlet 80 is supplied to a component 81 which has changing needs for air during the operation of the platform 100. The method includes determining a change in a demand of air at the outlet 80 (block 202). In response to determining the change in the demand, the flow control valve 70 and the balancing valve 20 are controlled to adjust the airflow through the conduit 120 (block 204). The synchronized adjustments to the balancing valve 20 and the flow control valve 70 provide for the air source 110 to be able to supply the demanded air (block 206).

Figure 6:
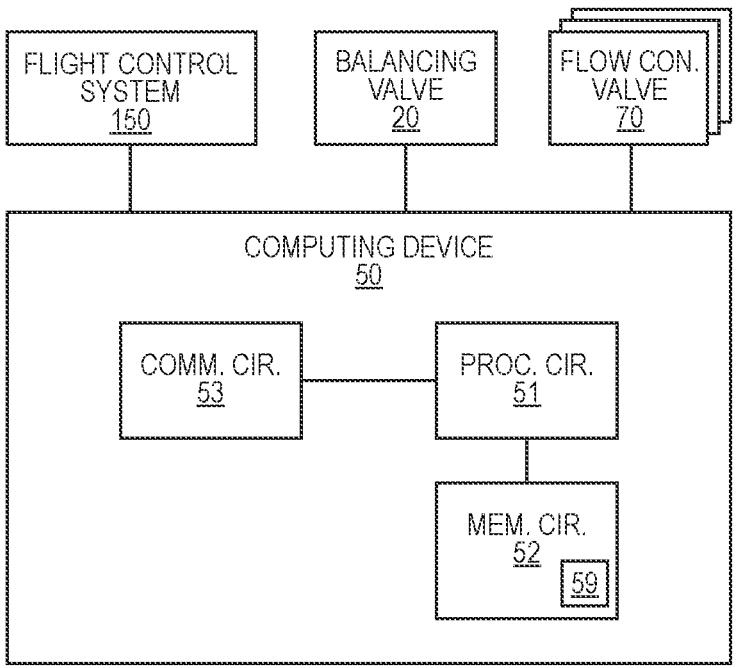
FIG. 6 is a schematic diagram of a computing device.

The computing device 50 is configured to control the pneumatic system 10 to isolate flow conditions at the air source 110 from highly variable downstream system conditions. As illustrated in FIG. 6, the computing device 50 includes processing circuitry 51 and memory circuitry 52. The processing circuitry 51 controls overall operation of the pneumatic system 10 according to program instructions 59 stored in the memory circuitry 52. The processing circuitry 51 includes one or more circuits, microcontrollers, microprocessors, hardware, or a combination thereof. Memory circuitry 52 includes a non-transitory computer readable storage medium storing program instructions 59, such as a computer program product, that configures the processing circuitry 51 to implement one or more of the techniques discussed herein. Memory circuitry 52 can include various memory devices such as, for example, read-only memory, and flash memory. Memory circuitry 52 can be a separate outlet as illustrated in FIG. 4 or can be incorporated with the processing circuitry 51. Alternatively, the processing circuitry 51 can omit the memory circuitry 52, e.g., according to at least some embodiments in which the processing circuitry 51 is dedicated and non-programmable.

The communication circuitry 53 is configured to send and/or receive signals from the balancing valve 20 and the flow control valves 70. The signals can be transmitted wirelessly or through a wired connection. The communication circuitry 53 is also configured to be in communication with a flight control system 150 that oversees operation of the aircraft 100. The flight control system 150 communicates the demands of the outlets 80. In some examples, the communication circuitry 53 is further configured to communicate with a remote node located away from the aircraft.

In some examples, the computing device 50 includes a user interface (not illustrated) comprising one or more of a user interface and input devices for a user to access information about the pneumatic system 10.

Figure 7:
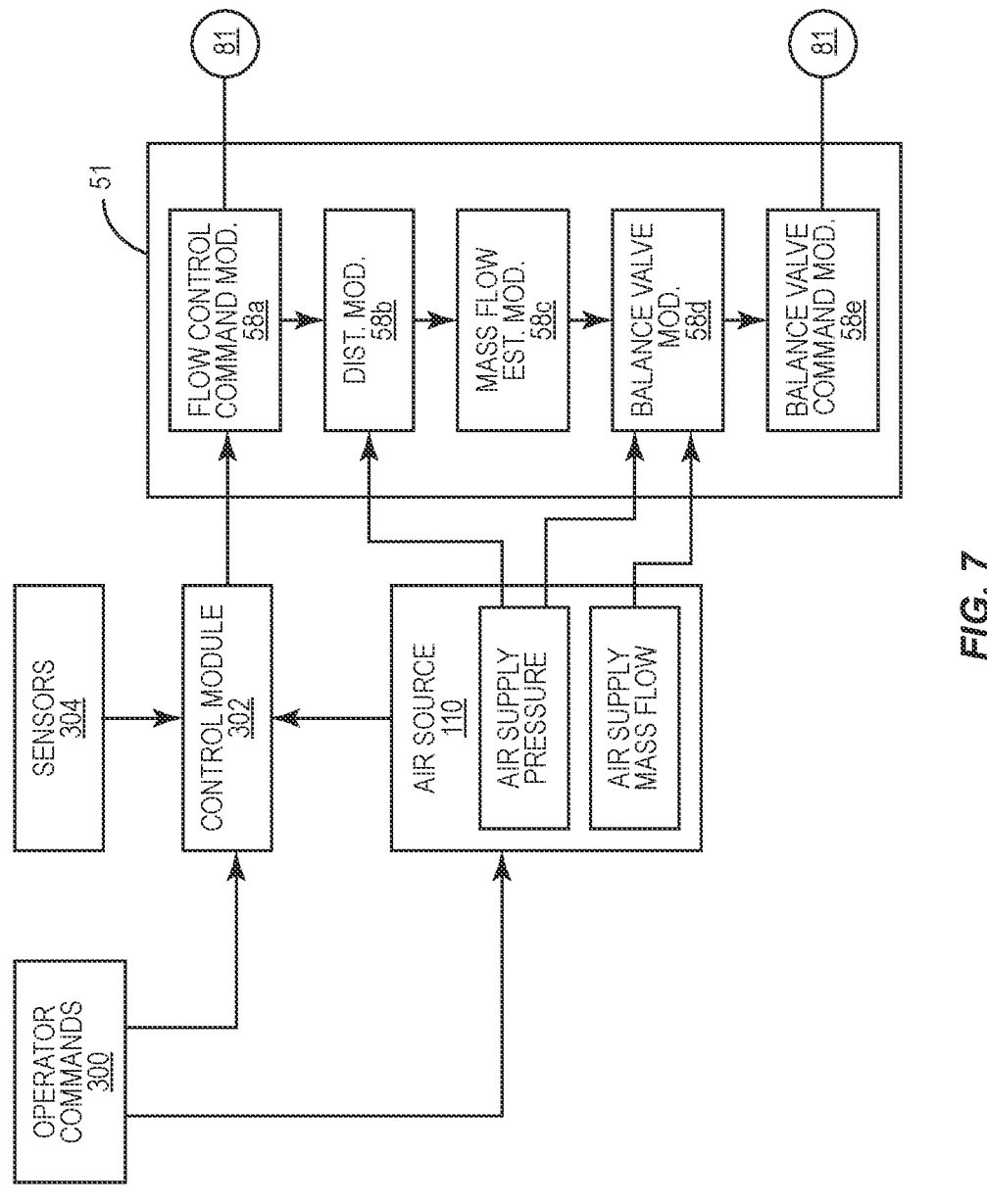
FIG. 7 is a schematic diagram of a control algorithm of the operation of the pneumatic system.

FIG. 7 schematically illustrates a control algorithm for operation of a pneumatic system 10 that is incorporated within an aircraft. The processing circuitry 51 includes modules 58 for operating the pneumatic system 10. The modules 58 include a flow control command module 58*a* that sends commands to the components 81, such as a flow control effector. A distribution system module 58*b* determines air distribution parameters. A mass flow estimate module 58*c* determines a mass flow through the pneumatic system 10. A balance valve module 58*d* determines the synchronized movement of the balance valve 20 with the flow control valve 70. A balance valve command module 58*e* provides command signals to position the components 81.

Operator commands 300 for controlling the components 81 are sent to the air source 110 and to a control module 302. In one example, the operator commands 300 are received through input from a pilot operating the aircraft. The needed air supply pressure and mass flow are determined based on the operator commands 300. The control module 302 determines the settings for the components 81 based on the operator commands 300, signals from the air source 110, and signals from one or more sensors 304 on the aircraft. In some examples, the control module 302 is a guidance and navigation control algorithm module that controls operation of one or more systems within the aircraft 100. The control module 302 signals the flow control command module 58*a* to operate the flow control valves 70.

In addition, the balance valve module 58*d* receives inputs from the other modules 58 and the air source 110 to operate the balance valve 20. Thus, both the flow control valves 70 and the balance valve 20 are synchronously operated to de-couple air source dynamics from air output demand dynamics. The balance valve command module 58*e* then signals the commanded position for the balancing valve 20.

The process does not include feedback loops within the control algorithm. Inputs are provided to the modules 58 to control the balancing valve 20 and the flow control valves 70. There is no feedback from the modules 58 or other elements (e.g., sensors downstream from the balancing valve 20 and/or flow control valve 70) that are used in the control of the pneumatic system 10.

In some examples (not illustrated), one or more sensors are positioned along the conduit 120, such as along the main line 121 and/or branch lines 122. The sensors detect one or more aspects of the air flow (e.g., mass flow, pressure, temperature). The sensors provide feedback to the computing device 50 which can adjust one or more of the elements of the pneumatic system to change the air flow as needed.

In examples in which the pneumatic system 10 is used within an aircraft, the computing device 50 receives air demands for the one or more components from a flight control system 150 that controls the operation of one or more aspects of the aircraft. In examples in which the pneumatic system 10 is used in other applications, the air demands can be received from various sources, such as but not limited to an overall system controller, a remote node, and user inputs.

In the examples disclosed above, the pneumatic system 10 is used with air. The concepts disclosed herein can also be used with other applications that use a compressible working fluid. Examples of working fluids include but are not limited to nitrogen, hydrogen, and methane.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A pneumatic system within a platform that supplies air from an air source to a downstream outlet, the pneumatic system comprising:

a conduit that extends between the air source and the outlet;

a balancing valve positioned along the conduit between the air source and the outlet, the balancing valve configured to adjust a flow of air through the conduit, the balancing valve comprising an exhaust port to exhaust the air from the conduit;

a flow control valve positioned along the conduit, the flow control valve configured to adjust the flow of the air that is directed to the outlet; and a computing device that synchronizes adjustments to the balancing valve and the flow control valve to actively control the flow of air through the conduit;

wherein the exhaust port is configured to exhaust the air at a predetermined level and is not controlled by the computing device.

2. The pneumatic system of claim 1, wherein the computing device controls the balancing valve and the flow control valve to set a pressure at the air source.

3. The pneumatic system of claim 2, wherein the computing device is configured to synchronously adjust the balancing valve and the flow control valve for a mass flow along the conduit to be variable downstream from the balancing valve to the outlet.

4. The pneumatic system of claim 1, wherein the computing device is configured to synchronously adjust the balancing valve and the flow control valve to maintain a total resistance along the conduit.

5. The pneumatic system of claim 1, wherein the computing device obtains, from a flight control system, an air demand at the outlet, then synchronously adjusts the balancing valve and the flow control valve accordingly to meet the demand.

6. The pneumatic system of claim 1, wherein the pneumatic system is positioned within an aircraft and is part of an active flow control system that delivers the air to a flow control effector mounted at the outlet.

7. The pneumatic system of claim 1, wherein the conduit comprises:

a main line; and a branch line that extends from the main line;

wherein the balancing valve is positioned along the main line and the flow control valve is positioned along the branch line.

8. The pneumatic system of claim 1, further comprising an air conditioning unit positioned along the conduit to treat the air, the air conditioning unit positioned upstream from the balance valve and the flow control valve.

9. A pneumatic system within a platform that supplies air from an air source to downstream outlets, the pneumatic system comprising:

a conduit that directs the air from the air source to the downstream outlets;

a balancing valve positioned along the conduit, the balancing valve comprising an exhaust port to exhaust the air from the conduit at a predetermined pressure;

a flow control valve positioned along the conduit;

wherein the balancing valve and the flow control valve are synchronously controlled to deliver the air that has moved through both the balancing valve and the flow control valve; and wherein the balancing valve and the flow control valve are controlled to adjust the flow of the air at working levels that are below the predetermined pressure.

10. The pneumatic system of claim 9, further comprising a computing device configured to inversely control the balancing valve and the flow control valve.

11. The pneumatic system of claim 9, wherein the flow control valve is a first flow control valve that controls the air to a first one of the downstream outlets and further comprising a plurality of additional flow control valves that control the air to a plurality of additional downstream outlets.

12. The pneumatic system of claim 9, wherein the balancing valve and the flow control valve de-couple air source dynamics at the downstream outlets from air output demand dynamics at the air source.

13. The pneumatic system of claim 9, wherein the balancing valve and the flow control valve are synchronously controlled to maintain a pressure within the conduit at the air source.

14. The pneumatic system of claim 9, wherein the balancing valve is positioned along the conduit upstream from the flow control valve.

15. The pneumatic system of claim 9, further comprising an air conditioning unit positioned along the conduit to heat the air, the air conditioning unit positioned upstream from the balance valve and the flow control valve.

16. A method of controlling air that moves through a pneumatic system from an air source to an outlet, the method comprising:

directing the air through conduit from the air source to the outlet with the air initially moving through a balancing valve and then through a flow control valve prior to be expelled from the outlet;

determining a change in a demand for air at the outlet;

in response to determining the change in the demand, synchronously adjusting both the flow control valve and the balancing valve and thereby decoupling air source dynamics at the outlet from air output demand dynamics at the air source; and exhausting the air through the balancing valve when a pressure exceeds a predetermined level.

17. The method of claim 16, further comprising maintaining a total resistance on the air source while adjusting the flow control valve and the balancing valve.

18. The method of claim 17, further comprising simultaneously adjusting one of the balancing valve and the flow control valve and increasing the resistance a first amount and adjusting the other of the balancing valve and the flow control valve and decreasing the resistance by the first amount.

19. The method of claim 16, further comprising:

heating the air along the conduit prior to the air reaching the balancing valve.

20. The method of claim 16, wherein determining the change in the demand for the air at the outlet comprises receiving the change in the demand from a flight control system of an aircraft.

\* \* \* \* \*